Dec. 8, 1959 W. R. HARRY 2,915,801
APPARATUS FOR FORMING PLASTIC CLAY BODIES
Filed Dec. 5, 1957 2 Sheets-Sheet 1

INVENTOR.
William R. Harry
BY Robert D. Silver
Attorney

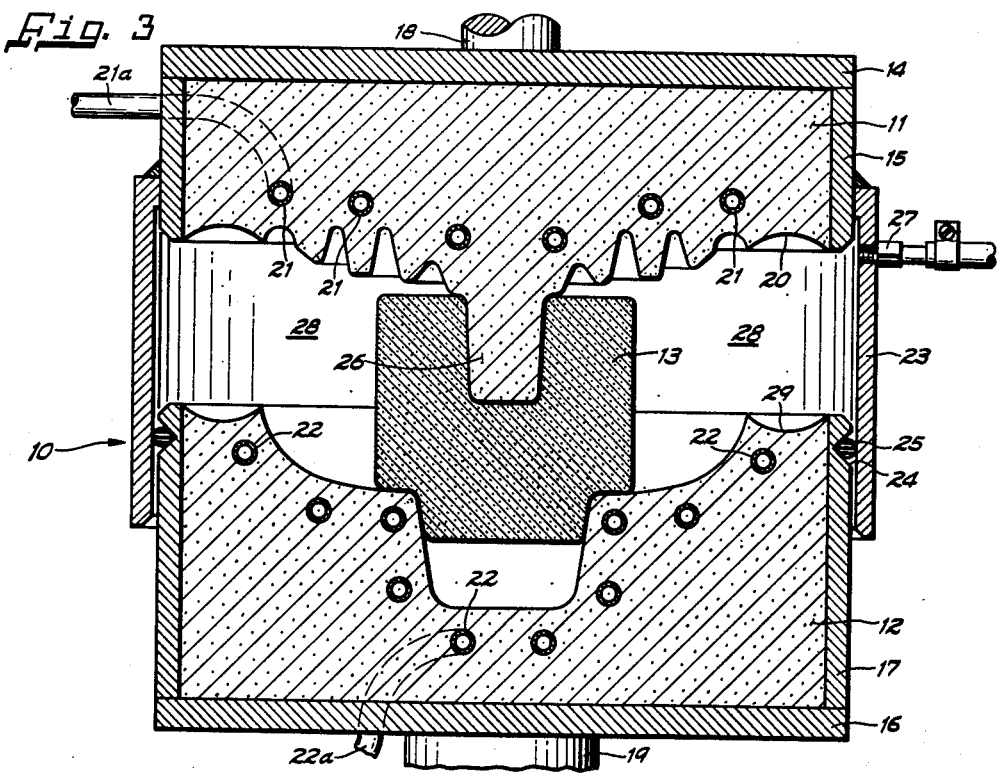
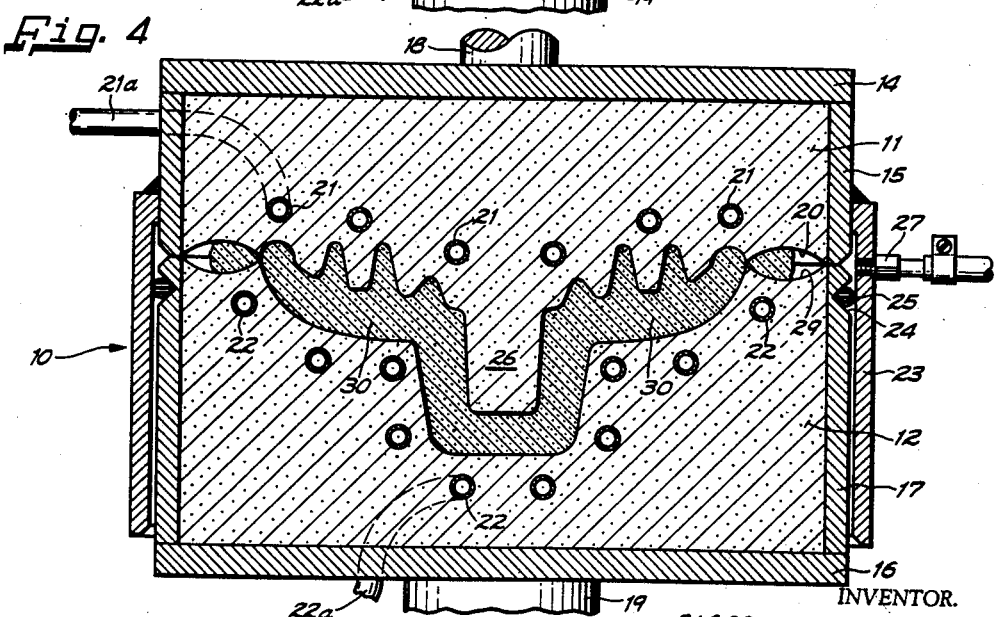

United States Patent Office 2,915,801
Patented Dec. 8, 1959

2,915,801

APPARATUS FOR FORMING PLASTIC CLAY BODIES

William R. Harry, Hartland, Wis., assignor to McGraw-Edison Company, Milwaukee, Wis., a corporation of Delaware Application December 5, 1957, Serial No. 700,866

1 Claim. (Cl. 25—27)

This invention relates in general to apparatus for forming objects from billets of clay and the like, and more particularly, relates to apparatus for forming objects by a press operation in contradistinction to a casting operation.

The conventional method of forming objects such as electric insulators or the like which have a rather wide flanged or skirt portion and a deep central cavity has been by the individual casting thereof in a mold. This casting operation requires much handwork, much floor space and a large inventory of molds. The conversion of the manufacture of some clay objects from the casting to the stamping or pressing operation is a recent phenomena. However, in attempting to apply standard pressing or stamping techniques to the manufacture of insulators or the like of the type aforementioned having wide irregularly shaped skirts and a fairly deep central cavity, great difficulties were encountered. More particularly, it was found that cracks would develop in the finished insulators, particularly in the area of the central cavity. Investigation showed that during the pressing operation of the clay billet, the clay would tend to leave contact with an extending male portion of the mold. This would occur during the intermediate portion of the pressing operation. Near the end of the pressing operation, the clay would be forced back into the contact with the said extending male portion of the mold. However, this second contact would occur on a different flow line. This difference in flow line gave rise to a fold or defect in the wall portions surrounding the central cavity. Said fold would then tend to crack during the heating and curing operation in the kiln. This defect was fatal to all commercial use of the insulators.

It is an object of this invention to provide a novel apparatus for overcoming the aforenoted problem of a fold in the clay due to the clay leaving contact with one of the mold members during the pressing operation.

Another object of the invention is to provide apparatus for overcoming the aforenoted problem by the application of pressure to the billet of clay during the pressure stroke of the press to maintain the billet of clay in intimate contact with the male mold member to thereby obviate folds in the central area.

A further object of the invention as above described is to provide apparatus for applying above atmospheric fluid pressure upon the outer surfaces of the clay billet during the pressing operation to thereby prevent the above noted parting of the clay from the mold surface.

The novel features that are characteristic of the invention are set forth with particularity in the appended claim; the invention itself, however, both as to its organization and its method of operation, together with additional objects and advantages thereof, will best be understood by the following description of a specific embodiment when read in connection with the accompanying drawings in which:

Fig. 3 is a view similar to Fig. 2, the molds being relatively disposed in another intermediate portion of the press stroke, the male mold member having entered the clay;

Fig. 4 is a view similar to Figs. 2 and 3 above, the molds being disposed in their relative positions at the completion of the press stroke.

Figure 1:
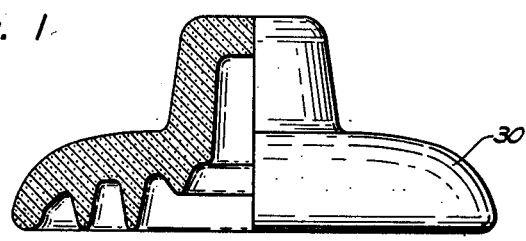
Fig. 1 is a view, partially in section, of an electric insulator having a wide skirt portion and a fairly deep central cavity.
Figure 2:
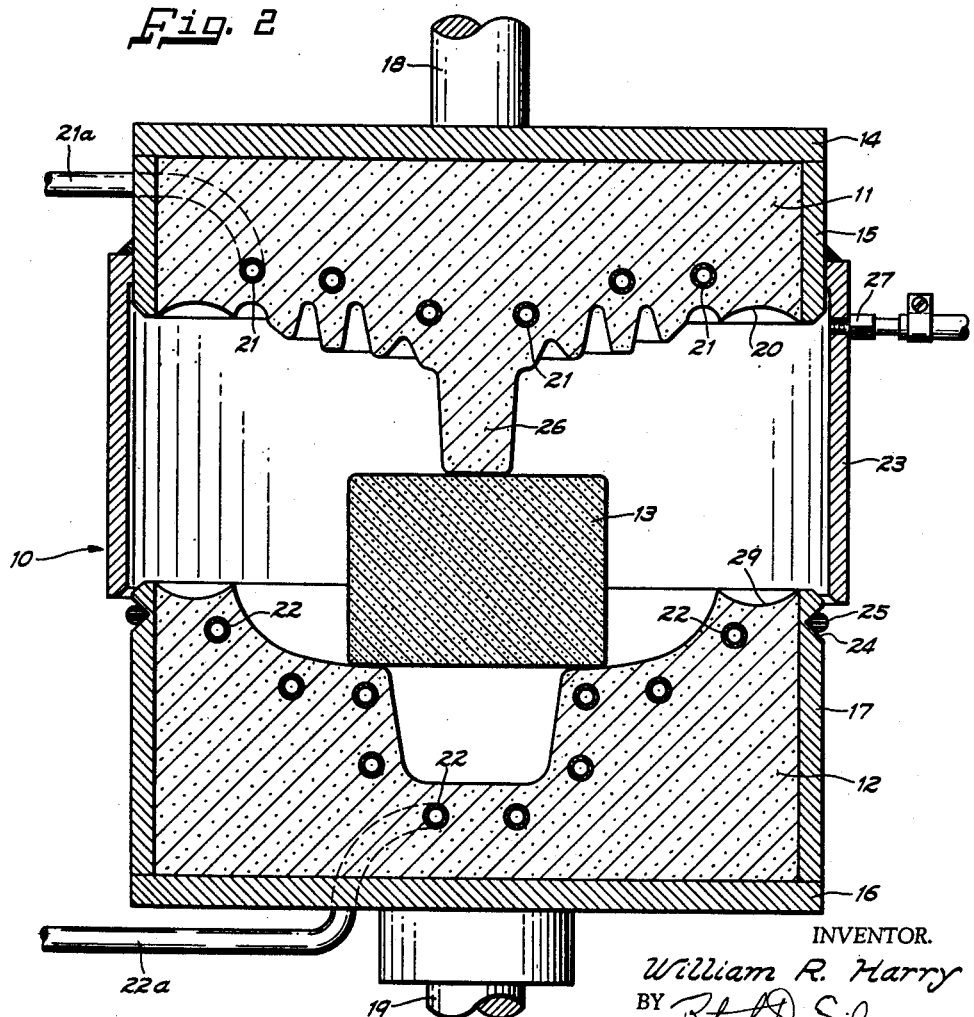
Fig. 2 is a sectional view of a pair of cooperating mold members which are adapted to pressure mold a billet of clay into the final configuration shown in Fig. 1, said mold members being shown in their relative positions during an intermediate portion of the press stroke where the male mold member is just coming into contact with the billet of clay.

Turning now to the drawings, and more particularly to Fig. 2, a pair of molds indicated generally by the reference numerals 10 are shown in an intermediate open position, the male member of the mold just coming into contact with a billet of plastic moist clay 13. The molds as shown comprise a top mold section 11 and a bottom mold section 12. In the particular case shown, the two molds are of the configuration capable of pressing an electric insulator 30 of a configuration as shown in Fig. 1.

More specifically, each mold section has a generally cylindrical housing means, the upper mold housing means having a bottom wall portion 14 and an annular side wall portion 15 and the lowermost mold housing means being formed with a bottom wall portion 16 and an annular side wall portion 17. Each mold section 11 and 12 may be formed from a suitable porous material which will ordinarily be high grade gypsum plaster or gypsum cement.

As shown, the top mold section 11 is preferably mounted on a connecting rod 18 and the bottom mold section is mounted on a stationary platform not shown and/or another connecting rod such as 19. It will be apparent that the upper mold section 11 and the lower mold section 12 are adapted to move axially relative to each other with approaching and separating movement to thereby form an article as shown in Fig. 1. The excess clay that is provided for the pressing operation is removed by gutters 20 and 29, as well understood in the art.

Means for releasing the pressed article from the molds is disposed internally of each of the mold sections 11 and 12. As shown, a series of perforated conduits are embedded in the molds themselves, the ones in the upper mold 11 being denominated with the reference numeral 21 and those in the lower mold denominated 22. Each of these conduits 21 and 22 are adapted to distribute the releasing fluid throughout the porous mold. The conduits 21 and 22 are connected at one end to an external conduit extension 21a and 22a, respectively, which extensions pass through the housing walls 15 and 17, respectively, for attachment to a suitable fluid reservoir (not shown). Suitable valve means is disposed intermediate the reservoir and the mold for introduction of fluid under pressure into the molds at a predetermined time of the operation as shall be explained hereinafter.

Means for providing a sealed chamber so as to provide a pressing operation above atmospheric pressure is afforded by the operation of a housing side wall extension 23 disposed on the side wall 15 of the upper housing means and with a sealing O-ring disposed on the side wall 17 of the lower housing means. More particularly, as shown in Fig. 2 of the drawings, the annular side wall 15 of the upper mold 11 is formed with an annular extension 23 which is slightly larger in diameter than the outside diameter of the housing wall 17 of the lower mold 12. The lower housing side wall 17 may be formed with a circumferential groove 24 which is formed in the top of wall 17 as viewed in the drawings. A suitable O-ring 25 which may be made of a suitable material that is commercially available such as material having the trade names nylon or Teflon may be disposed within the groove 24 for sealing coaction with the inner wall surface of housing extension 23. It is, of course, apparent that the relative positions of the housing extension 23 and sealing O-ring 25 may be in a reversed relation, i.e., the extension 23 be formed on the lower mold 12 in the sealing O-ring 25 disposed on the upper mold 11.

It will be apparent that a substantially sealed chamber 28 is formed when the two mold sections 11 and 12 are in a proximity such that the O-ring 25 is in engagement with the interior surface of housing extension 23. Means for introducing above atmospheric pressure into chamber 28 is provided by fluid inlet means 27 which is formed in the housing extension means 23. The inlet means 27 is attached to a suitable reservoir (not shown) for introduction of fluid under pressure. Suitable valve means (not shown) is also provided to afford selective introduction of the fluid (air) under pressure as suitable and desired depending on the particular configuration of molds.

The usual cycle of operation is as follows: A batt of clay which has been previously de-aired, etc., is placed in the position shown in Fig. 2 of the drawings while the molds are separated a sufficient distance (not shown) to allow easy handling and entry. The molds are then actuated toward closed position so that depending mold extension 26 on the upper male mold 11 comes in contact with the upper surface of the batt of clay 13 as shown in Fig. 2. While the molds are in this intermediate position, it is seen that the extension 23 and the O-ring 25 are not as yet in contact with each other and, thus, there is space for air to communicate between the area defined by the housing extension 23 and the outside around the end surface of said housing extension.

As the pressing operation continues, as shown in Fig. 3 of the drawings, the depending mold extension 26 forces itself into the batt of clay, thereby forcing the bottom surface of said batt into contact with the central cavity of the mold 12. It is while the molds are in the position shown in Fig. 3 that fluid pressure is admitted to the chamber 28 through the inlet means to thereby force the batt of clay to remain in intimate engagement with the depending projection 26. Heretofore (without the pressure on the batt 13), when the molds are intermediate the positions shown in Figs. 2 and 4, trouble has occurred in that as the projection 26 forces its way into the interior of the batt 13, flow lines have developed as the clay tends to spread away from the projection 26 and then as the mold continues to press downwardly, the clay has been forced back into contact with projection 26 on a different flow line, said operation causing a fold in the clay which shows up as a defect in the finished articles. By providing a sealed chamber and by the admission of fluid pressure through the inlet means 27 during the press operation, the batt 13 is forced to remain in intimate engagement with the projection 26, the fluid pressure resisting the tendency of the batt 13 to spread away therefrom. The effective pressure is circumferentially applied at 90° to the axial movement of the molds to thereby reduce the spreading tendency under the axial movement of projection 26. The fluid pressure to inlet 27 is shut off prior to the mold reaching the position shown in Fig. 4. The precise position of the molds for increasing and decreasing pressures in chamber 28 is dependent on the configuration of the molded articles.

After the pressing operation is completed, as shown in Fig. 4, the pressure release fluid is admitted through conduit 22a to the conduits 22 of the bottom mold section and the fluid flows through the base of the mold 12 to the ware to release the latter from the mold. The pressure exerted by the fluid in the bottom half of the mold is sufficiently high to completely release the ware from the face of the mold and a fluid film is formed between the ware and the face of the mold.

The molds are then separated to their starting position (greater separation than the positions shown in Fig. 2) so that an operator may place his hand beneath the top mold 11 to grasp the pressed object. Fluid pressure is then admitted to the top mold 11 through conduit 21a and 21 to cause the ware to drop into the operator's hand for removal. Another batt is then disposed within the molds and the process is repeated.

Although a specific embodiment of the invention has been shown and described, it is with full awareness that many further modifications thereof are possible. The invention, therefore, is not to be restricted except insofar as is necessitated by the prior art and by the spirit of the appended claim.

What is claimed as the invention is:

Apparatus for pressure forming ceramic high tension electrical insulators comprising top and bottom annular relatively movable mold members adapted to press a billet of plastic moist clay into a cup shaped insulator having a central cavity and a plurality of skirts in spaced relation therearound, top and bottom annular housing means respectively surrounding said top and bottom mold members for movement therewith, annular housing extension means having an open end sealingly mounted to said housing means of said top mold member for movement therewith, fluid inlet means disposed in a side wall portion of said housing extension means for selectively admitting fluid under pressure to the interior thereof, a V-shaped groove formed in the upper portion of said bottom housing means, and sealing means comprising an O-ring disposed in said V-shaped groove in a manner to protrude radially outwardly a greater distance than the outside diameter of said lower housing means and operable to contact an inner wall surface of said housing extension means to maintain a sliding seal therebetween whereby a sealed chamber may be formed by said top and bottom housing means and said extension means during relative movement of said mold members and fluid under pressure may be admitted to said sealed chamber through said inlet means in said housing extension.

References Cited in the file of this patent

UNITED STATES PATENTS

| | | |
|---|---|---|
| 1,480,719 | Gammeter | Jan. 15, 1924 |
| 1,639,430 | Gammeter | Aug. 16, 1927 |
| 2,322,140 | Kalwoski | June 15, 1943 |
| 2,395,295 | Rowland | Feb. 19, 1946 |
| 2,584,109 | Blackburn et al. | Feb. 5, 1952 |
| 2,632,227 | Steele et al. | Mar. 24, 1953 |

FOREIGN PATENTS

| | | |
|---|---|---|
| 109,075 | Great Britain | Aug. 27, 1917 |